United States Patent [19]
Evans

[11] Patent Number: 5,934,722
[45] Date of Patent: *Aug. 10, 1999

[54] FOOD PORTIONING TOOL

[75] Inventor: Todd D. Evans, Corona, Calif.

[73] Assignee: Taco Bell Corporation, Irvine, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/920,418

[22] Filed: Aug. 29, 1997

[51] Int. Cl.$^6$ .................................................... A47J 43/28
[52] U.S. Cl. .................. 294/7; 294/55; 30/142; D7/692
[58] Field of Search ............................ 294/2, 7, 8, 23.5, 294/50.6, 55, 55.5; 30/322–325, 142; 16/116 R, DIG. 12, DIG. 16, DIG. 19; D7/662, 663, 691, 692

[56] References Cited

U.S. PATENT DOCUMENTS

| | | |
|---|---|---|
| 15,266 | 7/1856 | Lincoln ..................................... 30/325 |
| D. 297,092 | 8/1988 | Leung ...................................... D7/692 |
| D. 312,749 | 12/1990 | Kessler ..................................... D7/692 |
| D. 319,375 | 8/1991 | Pasinski et al. .......................... D7/692 |
| D. 354,204 | 1/1995 | McNaughton ............................ D7/692 |
| 915,233 | 3/1909 | Smith . |
| 937,754 | 10/1909 | Bartels . |
| 976,970 | 11/1910 | Wolary . |
| 1,447,432 | 3/1923 | Roberts ..................................... 30/322 |
| 1,723,507 | 8/1929 | Haertter ..................................... 294/7 |
| 1,761,104 | 6/1930 | Cutler ....................................... 30/322 |
| 2,539,225 | 1/1951 | Bettencourt . |
| 2,923,059 | 2/1960 | Campagna ................................. 30/325 |
| 3,020,826 | 2/1962 | Silva ......................................... 294/7 |
| 3,332,107 | 7/1967 | Bussard . |
| 4,616,867 | 10/1986 | O'Hara . |
| 5,076,627 | 12/1991 | Simon . |
| 5,161,842 | 11/1992 | Beeler . |
| 5,238,277 | 8/1993 | Robinson . |
| 5,248,153 | 9/1993 | Jones . |
| 5,536,055 | 7/1996 | Kohn . |

OTHER PUBLICATIONS

Photo No. 1, No Date.
Photo No. 2, No Date.
Photo No. 3, No Date.
Photo No. 4, No Date.
Photo No. 5, No Date.
Photo No. 6, No Date.
Photo No. 7, No Date.
Photo No. 8, No Date.
Photo No. 9, No Date.

*Primary Examiner*—Dean Kramer
*Attorney, Agent, or Firm*—Knobbe, Martens, Olson & Bear, LLP

[57] ABSTRACT

A portioning tool designed to provide consistent portions of ground beef or other food product. The portioning tool has a scoop with a plurality of apertures. The apertures allow drainage of any excess liquid from the food product and aids in smoothly dispensing the ground beef. The apertures are larger than the average size of the food particle to be portioned. This prevents the food product from clogging the scoop or sticking to the scoop's side, which results in uneven portioning. The portioning tool also has an ergonomic shaped handle which aids in the proper orientation of the portioning tool in the user's hand. The handle may be attached to accommodate either left-handed or right-handed users.

27 Claims, 4 Drawing Sheets

FOOD PORTIONING TOOL

BACKGROUND OF THE INVENTION

1. Field of the Invention

The present invention relates to food portioning tools, and more specifically to portioning tools designed to easily dispense a consistent portion of food product such as ground beef without excessive sticking of the food product to the portioning tool.

2. Description of Related Art

Many restaurants currently use a variety of tools to dispense a portion of food onto or into a plate or similar food product (e.g, a taco shell). Pie knifes, scoops, and spoons have commonly been used for this purpose. While these tools adequately dispense food products, the amount dispensed varies widely from serving to serving.

Many situations require a more accurate method of dispensing food. For example, in quick-service mexican food restaurants, consistent portions of meat (e.g. ground beef) must be served on or into each taco and burrito served. Using existing tools presents a variety of problems. First, when a pie knife or similar tool is used, the worker must estimate the portion to be served. This results in inaccurate and inconsistent portion sizes; typically, under portioning results. Also, use of the pie knife in this manner is messy as the dispensed food product tends to fall off the knife, and waste commonly results.

To prevent food from falling off the dispenser, some restaurants use scoops. Most scoops, however, are not properly shaped to dispense meat or other consumables into a taco shell or other oddly shaped receptacles. For example, it is difficult to fill a narrow taco shell with a round scoop. To overcome this shortcoming, some scoops are shaped to easily fill a taco shell. These scoops have a length approximating the length of a taco shell and the opening in the scoop generally matches the width of the opening on the top of the taco shell. In the existing scoops shaped to fill tacos, however, the ground beef tends to stick in the scoop. This results in inconsistent portions after only a brief period of use.

A need therefore exists for a tool capable of providing consistent portions of food such as ground beef. The tool should be shaped to easily fill an oddly shaped receptacle. To ensure consistency between portions, the tool should minimize the amount of food that may stick.

SUMMARY OF THE INVENTION

One aspect of the invention thus involves, a food portioning tool comprises a first side having a plurality of apertures and a second side comprising a plurality of prongs. The prongs extend from a top to a base of the second side, the prongs being spaced apart from one another to create openings between adjacent prongs. A bottom interconnects the first side and the second side and has at least one drainage aperture. A handle is connected to one of the first and second sides.

In accordance with another aspect of the present invention, a hand-held food portioning tool is provided. The tool comprises a trough created by a first side, a second side, and a bottom. The trough has an elongated opening. A handle includes a top surface, a bottom surface, and two opposing side surfaces, and is connected to the trough. The top surface of the handle is located on the same side of the tool as the opening of the trough, and the top and bottom surfaces have a width less than the height of the side surfaces. When held in the palm of the user's hand, the handle orients the opening of the trough in the same direction as the user's palm faces.

An additional aspect of the invention involves a food portioning tool comprises a receptacle having a top opening defined by at least two sides, each side including a periphery. The top opening has a ratio of length to width of at least about 4 to 1. A plurality of openings in each side reduces the surface area of the side within the periphery by at least about 35%. At least one of the openings has a size equal to at least about 3% of the area defined within the periphery. A handle is coupled to the receptacle.

BRIEF DESCRIPTION OF THE DRAWINGS

These and other features of the invention will now be described with reference to the drawings of a preferred embodiment, which is intended to illustrate and not limit the invention, and in which.

DETAILED DESCRIPTION OF THE PREFERRED EMBODIMENT

Figure 1:
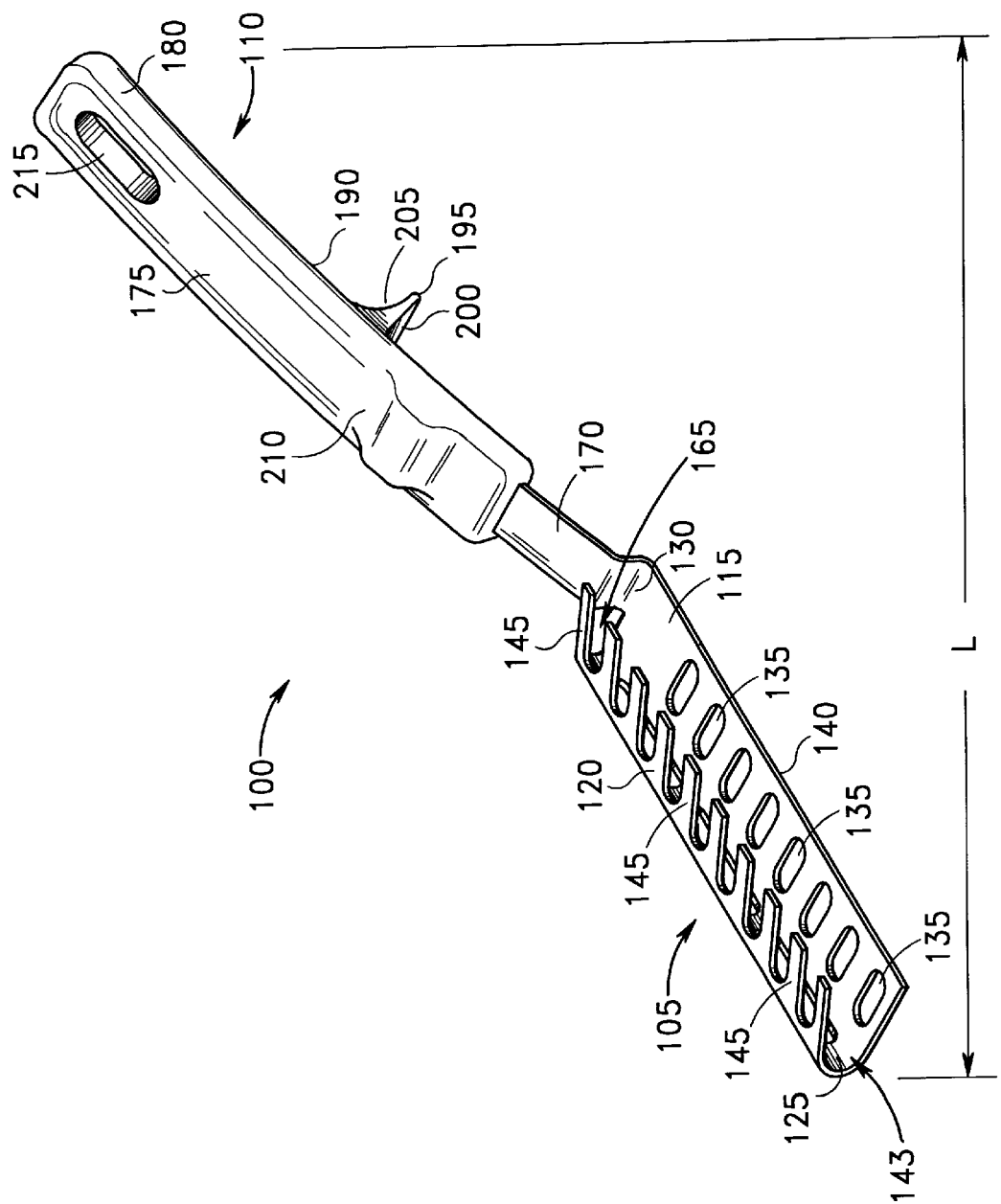
FIG. 1 is a perspective view of the food portioning tool of the preferred embodiment of the present invention.
Figure 2:
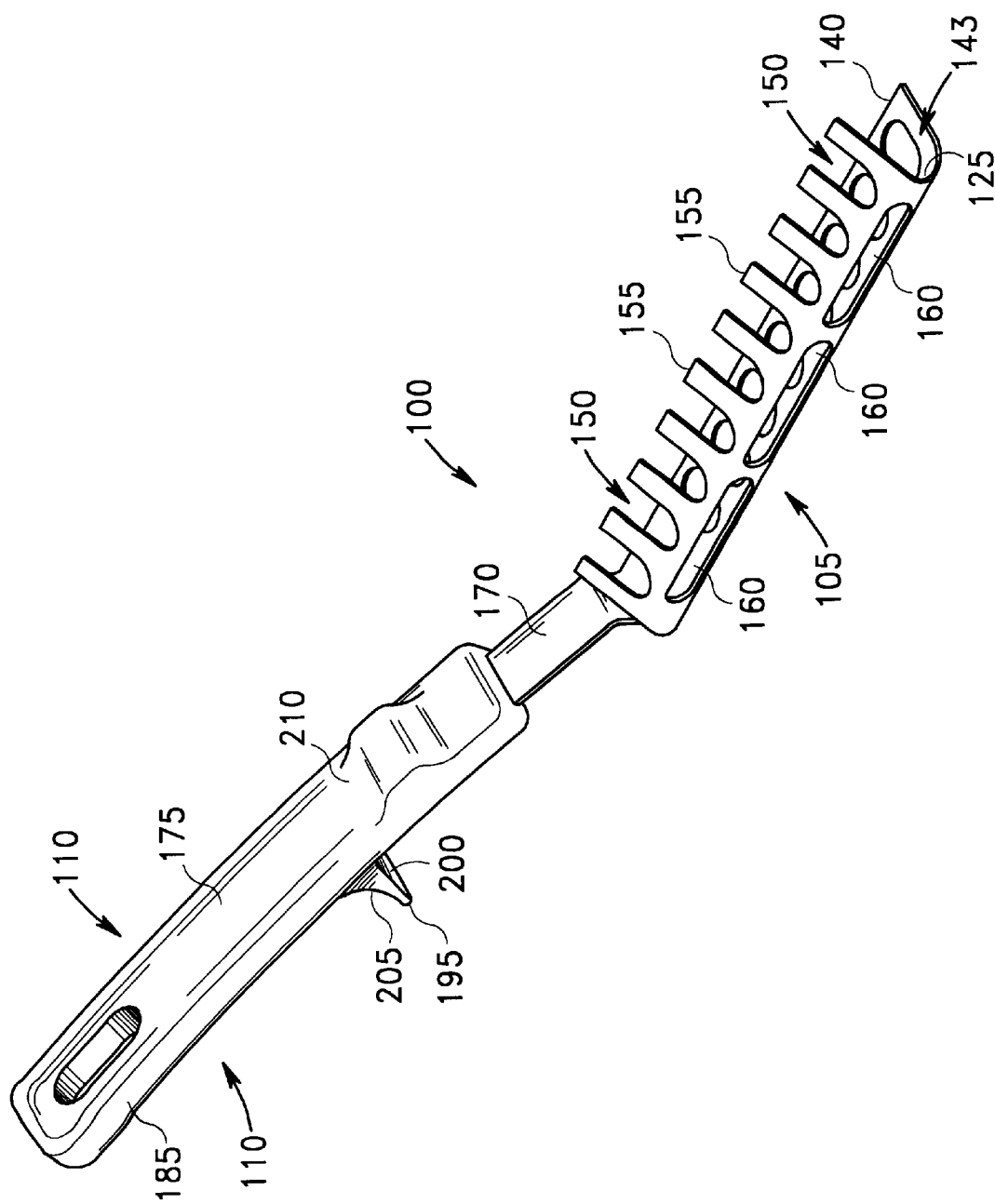
FIG. 2 is a reverse perspective view of the food portioning tool of FIG. 1.
Figure 3:
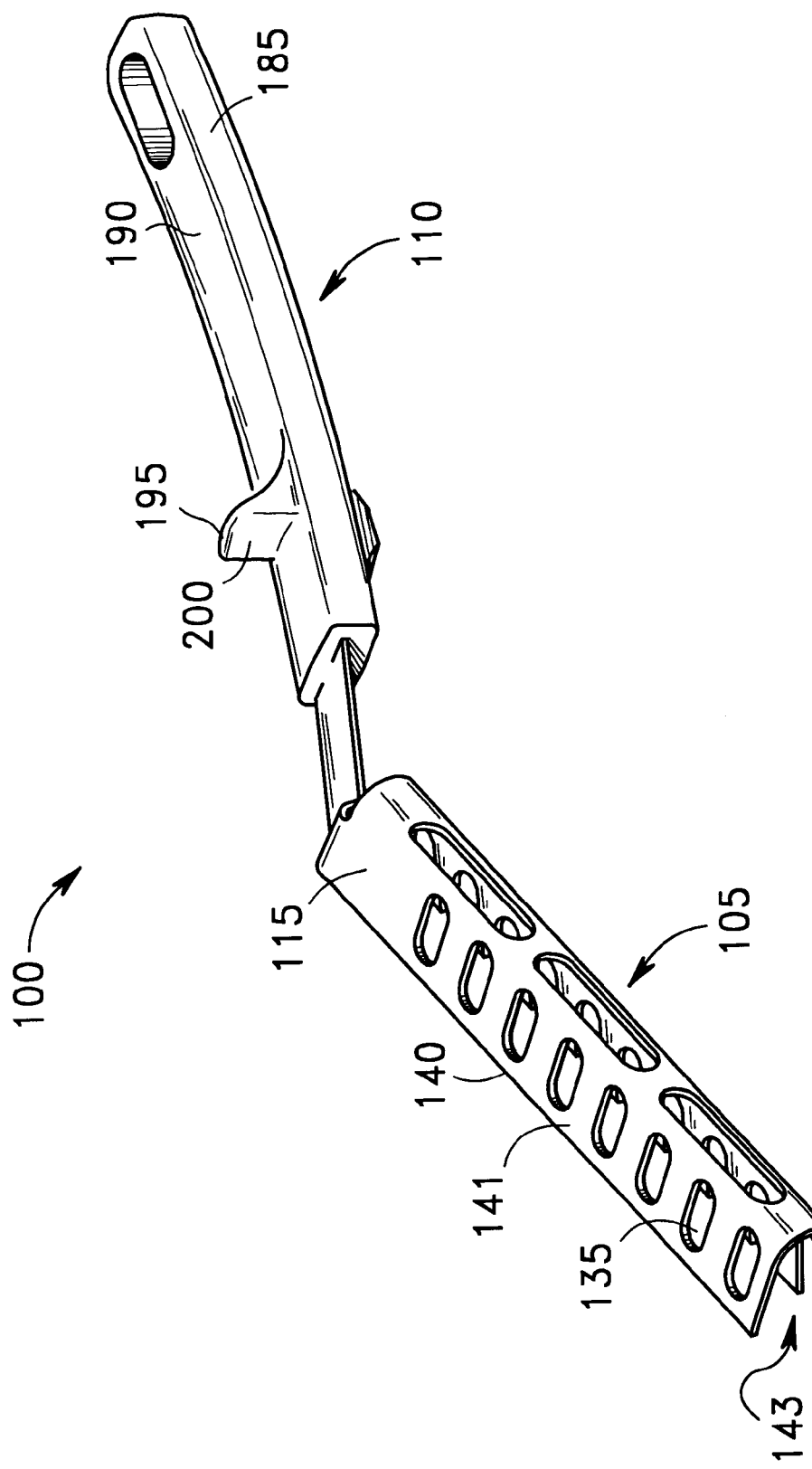
FIG. 3 is a perspective view showing the bottom of the food portioning tool of FIG. 1.

A portioning tool or utensil 100 of the preferred embodiment of the present invention is shown in both FIGS. 1–3. The portioning tool 100 measures and dispenses consistent portions of food products. The shape of the portioning tool 100 desirably is designed to suit a particular application. For example, when filling taco shells, the portioning tool 100 is long and narrow. The following describes the portioning tool in this context for illustration purposes only.

The portioning tool 100 comprises two portions: a scoop 105 and a handle 110. The scoop 105 has a trough-like configuration and is defined between opposing first and second walls 115, a bottom wall 125, and an end wall 130. The length of the scoop 105 desirably corresponds to the application desired. For example, when filling taco shells, the preferred length of the scoop 105 allows easy transfer of taco meat or other food product from the scoop 105 to the taco shell. This suggests a long, narrow scoop 105. In an exemplary embodiment, the scoop 105 has a length of less than 12 inches, and preferably equal to about 5.0 inches.

The portioning tool 100 has an overall length L as shown in FIG. 1. The length L is sized to allow the entire portioning tool 100 to fit into a standard half-pan or quarter-pan. Because the portioning tool 100 fits into standard pans, the user may easily scoop meat as the amount of meat in the pan decreases. In the illustrated embodiment, the length L is approximately 10.5 inches.

The first wall 115 of the scoop 105 contains a series of apertures 135. In the illustrated embodiment, the apertures are elongated and oval-shaped; however, other sizes and shapes of the apertures 135 are possible. For example, the apertures can have circular, rectangular, oblong, or other shape and still achieve the desired result. The apertures 135 reduce the surface area of the first wall 115 to lessen the tendency for the beef to stick. In the illustrated embodiment, the apertures 135 reduce the surface area by at least about 40%. However, the surface area of the first wall 115 can be reduced in the range of 30%–50%, preferably 35%–45%, but also 30%–40% and 40% to 50%.

The size of the apertures can also vary so long as the aperture is significantly larger than the average size of a particle of the food product to be transferred. For example, to prevent clogging when the scoop 105 is used with ground beef, the aperture desirably is larger than the majority of particles of the ground beef. Food particles tend to clog smaller apertures. By increasing the size of the aperture 135 the food is transferred without clogging the scoop 105. In the illustrated embodiment, each aperture is about 5/16" by 1/2" for use with ground beef.

The apertures 135 also decrease the amount of surface area of the first wall 115. The typical ground beef used in tacos has a tendency to stick to the walls of the scoop 105. By decreasing the surface area of the first wall 115, the adhesion of the beef to the scoop 105 is also decreased. The use of apertures 135 allows for a scoop 105 with enough surface area to hold the beef in the trough when upright, yet allows the beef to be smoothly released when the scoop 105 is inverted. To ensure the apertures 135 do not clog and the side surface is significantly reduced to inhibit stickage, at least one of the apertures 135 desirably reduces the surface area of the first wall 115 by at least 3%. More preferably, at least one of the apertures should reduce the surface area of the first wall by about 3%–7%. Of course, it is preferable for each aperture 135 to similarly decrease the surface area with the apertures being of equal size and shape. In the illustrated embodiment, each aperture 135 reduces the surface area about 5%.

The first wall 115 terminates in an upper scraping edge 140. The scraping edge 140 assists the scoop 105 cutting through the ground beef. When the scoop 105 is drawn through a warming pan of ground beef, the scraping edge 140 channels a portion of the ground beef into the scoop 105 for delivery to the taco shell.

Below the scraping edge 140 is a generally flat spreading surface 141. The spreading surface 141 aids the user in evenly spreading the meat. For example, when a tostada is filled with the portioning tool, it is desirable to evenly spread the meat across the shell. The spreading surface 141 allows the meat to be evenly spread after the portioning tool 100 dispenses the proper portion.

The second wall 120 of the scoop 105 is formed by a series of prongs 145. The prongs 145 extend from the bottom wall 125 to a top edge 155 of the second wall 120. In the illustrated embodiment, each prong is approximately 1/4" in width, with the first and last prong being half the size, or 1/8" width. A U-shaped cutout 150 exists between each adjacent prong 145. Of course, the cutouts 150 can have a variety of shapes, including rectangular, V-shaped or oblong. In the illustrated embodiment, the U-shaped cutouts 150 are approximately the same size as the apertures 135 in the first wall 115. However, the U-shaped cutouts 150 extend to the top edge 155 of the second wall 120. Like the apertures 135, at least one cutout 150 should reduce the surface area of the second wall 120 by at least 3%.

Forming the second wall 120 by a series of prongs 145 results in a wall with a greatly reduced surface area as compared to a solid wall. As was described above in relation to the first wall 115, the reduced surface area is desirable to reduce the tendency of the beef to stick to the second wall 120. The prongs 145 provide enough structure to hold the beef in the scoop 105 when the portioning tool 100 is held upright. The beef only needs to be held in the trough for a short duration of time for the purposes of transferring the beef from a warming pan onto a taco shell or tortilla. Although the second wall 120 is formed by the prongs 145, other constructions of the second wall 120 which reduces the surface area would suffice.

The first wall 115 and the second wall 120 are joined together by the bottom wall 125. The bottom wall 125 extends along the entire bottom length of both the first wall 115 and the second wall 120. The bottom wall 125 is generally curved in shape to form a U-shape in cross-section. The curved shape of the bottom wall 125 smoothly blends with the side walls to eliminate sharp corners in which food or other matter can collect. However, the bottom wall 125 could also be flat or have other shapes, such as, for example, V-shaped.

As is best seen in FIGS. 2 and 3, the bottom of the trough contains several bottom-draining apertures 160. In the illustrated embodiment, there are three bottom-draining apertures 160 equally spaced along the bottom wall 125. Of course, the number of bottom-draining apertures 160 can be increased or decreased depending upon the size of the scoop 105 and the size of each individual bottom-draining aperture 160. As with the apertures 135 of the first side wall 115, the bottom-draining apertures 160 should be sized to be greater than the average size of the food particle to be scooped. This prevents small food particles from clogging the apertures. In the illustrated embodiment, the draining apertures 160 are an elongated oval having a length approximately five times their width. Of course, as mentioned above, an increase in the number of apertures 160 can decrease the length of each individual aperture 160.

The bottom-draining apertures 160 also decrease the amount of surface area of the bottom wall 125. As discussed above, ground beef typically used in tacos has a tendency to stick to the walls of the scoop 105. By decreasing the surface area of the bottom wall 125, the adhesion of the beef to the scoop 105 is also decreased. The use of bottom-draining apertures 160 allows for a scoop 105 with enough surface area to hold the beef in the scoop 105 when upright, yet allows the beef to be smoothly released when the scoop 105 is inverted.

The amount of beef the scoop 105 holds is dependent upon the spacing between the side walls 115, 120, and the height of the first and second walls 115, 120 in combination with the depth of the bottom wall 125. In the illustrated embodiment, the distance from the bottom of the bottom wall 125 to the top of the walls 115, 120 is approximately one inch. The portioning tool 100 can be made in any of variety of sizes by proportionally adjusting the size of and spacing between each wall and bottom surface.

The top of the trough between the first wall 115 and the second wall 120 is open to scoop and dispense the food product. The size and shape of this opening is dependant on the particular application for which the portioning tool 100 is designed. For use in filling taco shells, the opening has the general shape of the opening in a taco shell, with the length being longer than the width. In general, the top opening should have a ratio of length to width of at least 4:1. In the illustrated embodiment, this ratio is approximately 7:1. The length to width ratio may be as high as 10:1.

As best understood from FIG. 1, one end of the scoop 105 is partially closed by an end wall 130. The end wall 130 has approximately the same height as the first wall 115 and the second wall 120. The end wall 130, however, does not enclose the corresponding end of the bottom wall 125. Thus, an end-draining aperture 165 is created at the base of the end wall 130. The purpose of the end wall 130 is two-fold. First, the end wall 130 prevents the food product in the scoop 105 from sliding rearward towards the handle 110 of the food portioning tool 100. However, the end-drain aperture 165 allows any excess liquid to drain from the scoop 105. This end-draining aperture 165 in combination with the other apertures 135, 150 and 160 of the scoop 105 ensure proper drainage of the food product before delivery and application. In addition, because the size of each aperture is greater than the average particle size of the food product, the apertures have less tendency to clog. Also, the reduced surface area created by the apertures aids in releasing the product when desired. This decrease in the tendency to clog and increase in product distribution from the scoop 105 ensures a more consistent portioning of food product from the food portioning tool 100.

The second end 143 of the scoop 105 is open. The second end 143 of the scoop 105, by being open, decreases the overall surface area of the scoop 105. This decreased surface area aids in smoothly releasing the beef from the scoop 105.

An angled connector 170 extends from the end wall 130 at an oblique angle relative to the side walls 115, 120 of the scoop 105. In the illustrated embodiment, the angled connector 170 extends at approximately a 35° angle relative to a plane defined by the first side 115 of the scoop 105. This angle provides a desired offset of the scoop 105 from the handle 110. This offset allows the scoop 105 to be fully inserted into a pan of food product without causing the user's hand to contact the food or the pan.

The scoop 105 may be formed from stainless steel or any other suitable material commonly used in the food utensil art. Preferably, a flat piece of metal is stamped to an appropriate size from which the scoop 105 is formed. The apertures are also stamped in this or a subsequent step. The stamped metal is then bent into the desired shape, forming both the scoop 105 and the angled connector 170.

The handle 110 is connected to the opposite end of the angled connector 170. In the illustrated embodiment, the handle 110 is a Grip 'n Serv® handle manufactured by The Vollrath Company, Inc. of Sheboygan, Wis. The handle 110 has generally a rectangular shape and includes a first side face 175, a top face 180, a bottom face 185 and a second side face 190. The height of the side faces 175 and 190 is greater than the width of the top face 180 and the bottom face 185.

To assist the user in gripping and storing the portioning tool 100, several features are included in the handle 110. A tab 195 is molded into the second side face 190 of the handle 110. The tab 195 has a front surface 200 and a back surface 205. On the first side face 175 of the handle 110, a thumb rest 210 is formed. The handle may also include a hanging aperture 215, as is shown in the figures. The hanging aperture 215 may be used to store the portioning tool 100 on a hook when not in use.

The handle 110 is made from a heat resistant material. Of course, if desired the handle may be made from a heat conducting material and covered with a protective coating or removable sheath or cover. In the illustrated embodiment, the handle 110 is molded plastic. The use of a heat resistant material or the use of a protective coating minimizes the risk of the user being burned if the tool 100 becomes heated.

The handle 110 is molded directly to the angled connector 170. By directly molding the handle 100, no seal or fastener is required to connect the handle 110 to the scoop 105.

Figure 4:
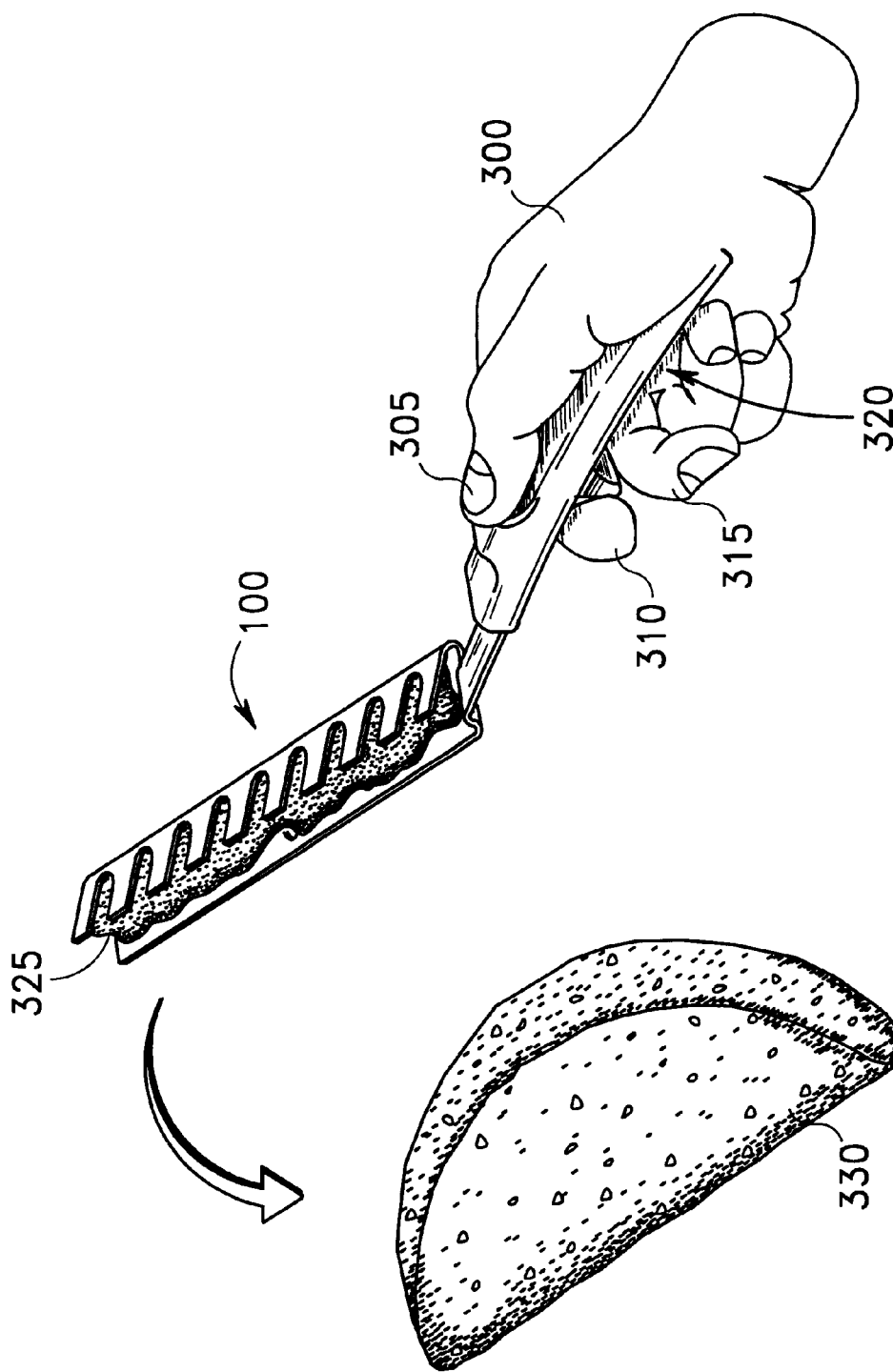
FIG. 4 is a schematic perspective view of the food portioning tool in use to fill a taco shell.

Proper orientation and operation of the ergonomic handle is shown in FIG. 4. FIG. 4 shows a user's hand 300 grasping the portioning tool 100. As can be seen, the thumb 305 of the user's hand 300 rests on the thumb rest 210 which is molded into the first side face 175 of the handle 110. The thumb rest 210 allows a user to grip the handle without the thumb 305 sliding forward on the first side face 175 of the handle 110. The index finger 310 of the user rest on the front surface 200 of the tab 195 molded into the second side face 190 of the handle 110. The combination of the thumb 305 and the index finger 310 provides a user control of the portioning tool 100. The middle finger 315 of the user's hand 300 may rest against the back surface 205 of the tab 195. When properly gripped in this manner, the ergonomic handle 110 orients the open end of the scoop 105 in the same direction in which the user's palm 320 faces. In this manner, the user controls the portioning of the food product 325 with movement of the wrist.

The illustrated embodiment shows the handle 110 attached to accommodate a right-handed user. The handle 110 can, however, be connected to the scoop 105 in such a manner to accommodate a left-handed user. For left-handed users, the handle is connected to the opposite end of the scoop 105 from the attachment shown in the illustrated embodiment. Therefore, for a left-handed tool, the end wall 130 would be connected to the second end 143 of the scoop 105.

As shown in FIG. 4, the scoop 105 filled with a food product 325 can be dispensed into a taco shell 330. By rotating the user's wrist as indicated by the arrow in FIG. 3, the palm 320 of the user's hand 300 rotates in a downward direction. This rotates the open end of the scoop 105 in the same direction. When the open end of the scoop is facing downward, gravity will release the food product 325 from the scoop 105 and dispense it into the taco shell 330. Of course, the taco shell 330 may be replaced by a burrito shell, a salad bowl, a hamburger bun, or any other item in which one desired to dispense a specific amount of food product 325.

Numerous variations and modifications of the invention will become readily apparent to those skilled in the art. Accordingly, the invention may be embodied in other specific forms without departing from its spirit or essential characteristics. The detailed embodiment is to be considered in all respects only as illustrative and not restrictive, and the scope of the invention is, therefore, indicated by the appended claims rather than by the foregoing description. All changes which come within the meaning and range of equivalency of the claims are to be embraced within their scope.

What is claimed is:

1. A food portioning tool comprising:
    a first side having a plurality of apertures;
    a second side comprising a plurality of prongs extending from a top to a base of the second side, the prongs being spaced apart from one another to create openings between adjacent prongs;
    a bottom interconnecting the first side and the second side, the bottom having at least one drainage aperture; and
    a handle coupled to one of the first and second sides.

2. A food portioning tool of claim 1, wherein the first side includes a straight upper edge.

3. A food portioning tool of claim 2, wherein the first side includes a spreading surface located below the upper edge.

4. A food portioning tool of claim 1, wherein the apertures of the first side have an elongated shape.

5. A food portioning tool of claim 1, wherein the drainage aperture is an elongated slot.

6. A food portioning tool of claim 1, wherein the handle extends at an oblique angle in reference to the side walls.

7. A food portioning tool of claim 1, wherein the handle is formed from a heat resistant material.

8. A food portioning tool of claim 1, wherein one end of the tool is open.

9. A food portioning tool of claim 1, wherein the apertures and openings decrease the surface area of the sides by at least about 30%.

10. A food portioning tool of claim 1, additionally comprising an end wall connected to at least one of the sides, the end wall partially closing one end of the portioning tool.

11. A food portioning tool of claim 10, wherein the sides and the bottom form a U-shaped trough.

12. A food portioning tool of claim 11, wherein the trough extends below the end wall.

13. A food portioning tool of claim 11, wherein the U-shaped trough has an opening having a ratio of length to width of at least about 4 to 1.

14. A food portioning tool of claim 1, wherein the handle comprises a top surface, a bottom surface, and two opposing side surfaces, the top surface of the handle being located on the same side of the tool as the opening of the trough, the top and bottom surfaces having a width less than the height of the side surfaces, whereby when held in the palm of the user's hand, the handle orients the opening of the trough in the same direction as the user's palm faces.

15. A hand-held food portioning tool of claim 14, wherein the handle extends at an oblique angle relative to a longitudinal axis of the trough.

16. A hand-held food portioning tool of claim 14, wherein the handle is connected to the first end of the trough for use by a right-handed person.

17. A hand-held food portioning tool of claim 14, wherein the handle is connected to the second end of the trough for use by a left-handed person.

18. A hand-held food portioning tool of claim 14, wherein the trough has a width smaller than a height of the trough as measured between the bottom and the opening.

19. A hand-held food portioning tool of claim 14, wherein the handle has a rectangular cross-section.

20. A hand-held food portioning tool of claim 14, wherein the handle is formed from heat resistant material.

21. A hand-held food portioning tool of claim 14, wherein the handle further comprises a thumb rest on a first side surface, and an index finger tab molded on the opposing side surface, whereby when properly gripped by a user, the index finger tab is sandwiched between the user's index finger and middle finger.

22. A food portioning tool comprising a trough having a top opening, the trough defined by at least two sides and a bottom, the bottom having a width not substantially greater than a width of the top opening, each side including a periphery, the top opening having a ratio of length to width of at least about 4 to 1, a plurality of openings in each side that reduce the surface area within the periphery of the corresponding side by at least about 30%, at least some of said plurality of openings each having a size equal to at least about 3% of the area defined within the periphery so as to prevent clogging of said opening, the bottom interconnecting the at least two sides and having at least one drainage aperture, and a handle coupled to the receptacle.

23. A food portioning tool of claim 22, wherein the handle extends at an oblique angle relative to one of said at least two sides.

24. A food portioning tool of claim 22, wherein the handle is formed from a heat resistant material.

25. A food portioning tool of claim 22, wherein the top opening has a ratio of length to width of not more than about 10 to 1.

26. A food portioning tool of claim 22, wherein the plurality of openings of one side reduces the surface area of the corresponding side between about 30% and about 50%.

27. A food portioning tool of claim 22, wherein each opening has a size equal to at least 3% of the area defined within the peripheral boundary.

\* \* \* \* \*